United States Patent
Arai et al.

(10) Patent No.: US 11,320,401 B2
(45) Date of Patent: May 3, 2022

(54) EDDY CURRENT FLAW DETECTION DEVICE AND EDDY CURRENT FLAW DETECTION METHOD

(71) Applicants: HITACHI ZOSEN CORPORATION, Osaka (JP); NIHON DENSOKUKI CO., LTD., Fukuoka (JP)

(72) Inventors: Hiroaki Arai, Osaka (JP); Akihiro Shin, Osaka (JP); Takaaki Yamada, Kitakyushu (JP); Hiroshi Azuma, Kitakyushu (JP)

(73) Assignees: Hitachi Zosen Corporation, Osaka (JP); Nihon Densokuki Co., Ltd., Fukuoka (JP)

( * ) Notice: Subject to any disclaimer, the term of this patent is extended or adjusted under 35 U.S.C. 154(b) by 0 days.

(21) Appl. No.: 16/648,705

(22) PCT Filed: May 22, 2018

(86) PCT No.: PCT/JP2018/019592
§ 371 (c)(1),
(2) Date: Mar. 19, 2020

(87) PCT Pub. No.: WO2019/064686
PCT Pub. Date: Apr. 4, 2019

(65) Prior Publication Data
US 2020/0284761 A1    Sep. 10, 2020

(30) Foreign Application Priority Data
Sep. 27, 2017    (JP) .............................. JP2017-185533

(51) Int. Cl.
*G01N 27/90*    (2021.01)

(52) U.S. Cl.
CPC .................. *G01N 27/9006* (2013.01)

(58) Field of Classification Search
None
See application file for complete search history.

(56) References Cited

U.S. PATENT DOCUMENTS

| | | | |
|---|---|---|---|
| 2009/0139335 A1* | 6/2009 | Kroning | G01N 27/9006 73/597 |
| 2012/0306483 A1* | 12/2012 | Boenisch | G01N 27/9006 324/239 |
| 2016/0240275 A1* | 8/2016 | Kitagawa | G21F 5/00 |

FOREIGN PATENT DOCUMENTS

| | | |
|---|---|---|
| CN | 107192758 A | 9/2017 |
| JP | 08-136509 A | 5/1996 |

(Continued)

OTHER PUBLICATIONS

International Search Report dated Jul. 17, 2018 issued in corresponding International Search Repod PCT/JP2018/019592 with English translation.

(Continued)

*Primary Examiner* — Noam Reisner
(74) *Attorney, Agent, or Firm* — Pillsbury Winthrop Shaw Pittman, LLP (57) ABSTRACT

The present invention provides an eddy current flaw detection device that sufficiently removes noise from a detection signal. A magnetic field is applied to a test object by a magnetic-field forming magnet. The magnetic flux density of a magnetic field generated by the magnetic-field forming magnet is set at a value in a predetermined range according to a distance between the magnetic-field forming magnet and a detection surface and the thickness of the test object.

5 Claims, 5 Drawing Sheets

(56) References Cited

FOREIGN PATENT DOCUMENTS

| JP | 2003-240504 A | 8/2003 |
|----|---------------|--------|
| JP | 2010-127854 A | 6/2010 |
| JP | 4885068 B2 | 2/2012 |
| JP | 2016-197085 A | 11/2016 |

OTHER PUBLICATIONS

Notice of Reasons for Refusal dated Jul. 13, 2021, issued in corresponding Japanese Patent Application No. 2017-185533 with English translation (8 pgs ).

* cited by examiner

EDDY CURRENT FLAW DETECTION DEVICE AND EDDY CURRENT FLAW DETECTION METHOD

CROSS-REFERENCE TO RELATED APPLICATIONS

This Application is the U.S. National Stage of PCT/JP2018/019592, filed May 22, 2018, which claims priority to Japanese Patent Application No. 2017-185533, filed Sep. 27, 2017, the contents of each of which are incorporated herein by reference in entirety.

TECHNICAL FIELD

The present invention relates to an eddy current flaw detection device and particularly relates to an eddy current flaw detection device using a magnetic saturation method. The present invention also relates to an eddy current flaw detection method.

BACKGROUND ART

Conventionally, an eddy current flaw detection device described in Patent Literature 1 is used as a flaw detection device for inspecting the presence or absence of a flaw (defect) on the surface of a structure (a subject, a test object) made of a conductive material. The device generates eddy current on a test object and detects the intensity of the eddy current and the change of the shape of eddy current flow, thereby inspecting the presence or absence of a flaw on the test object. If the test object has a flaw, the device can also determine the position, shape, and depth of the flaw.

It is known that a non-ferromagnetic material subjected to tapping, bending, or heating with a large work load becomes ferromagnetic. In the case of welding, in particular, a welded point has a high temperature and a large work load, so that an affected part becomes ferromagnetic. Thus, if a test object made of a non-ferromagnetic base material is partially welded, a part around a welded point of the test object is magnetized with an uneven magnetic field.

The inventors examined an inspection on whether a ferromagnetic area is flawed or not if a non-ferromagnetic material includes a ferromagnetic material with an uneven magnetic field. In the case of an inspection using the detection device of the related art, an area to be inspected has an uneven magnetic field and noise occurs in eddy current generated in a test object. Thus, it is quite difficult to detect a flaw.

For such a situation, a method of magnetic saturation (magnetic saturation method) is available. In this method a strong magnetic force is applied to an inspection area from the outside, which strongly forms a uniform magnetic field in the inspection area. Thus, the strong and uniform magnetic field cancels out an uneven magnetic field generated in the inspection area. Eddy current generated on the surface of a test object moves through the uniform magnetic field and thus a flaw on the surface of the test object may change the eddy current. Thus, a flaw can be detected by the method.

CITATION LIST

Patent Literature

Japanese Patent No. 4885068 is referred to as "Patent Literature 1" in this specification.

SUMMARY OF INVENTION

Technical Problem

However, a strong magnetic field is necessary for perfect magnetic saturation of all kinds of ferromagnetic materials that may be contained in the test object. In the case of a strong magnetic field simply generated by a magnet having a strong magnetic force, a magnet considerably larger than a sensor body or a special magnet is necessary. Moreover, a strong magnetic force is applied to a part magnetized by a magnet having a strong magnet force, leading to difficulty in moving an inspection device for detecting a flaw. If a weak magnetic field is applied to the test object, noise is not sufficiently removed.

An object of the present invention is to provide an eddy current flaw detection device and an eddy current detection method using a magnetic saturation method, by which noise is sufficiently removed by forming a proper magnetic field even if the magnetic field is not so strong.

Solution to Problem

An eddy current flaw detection device according to the present invention generates eddy current on a test object and inspects a state of a surface of the test object by detecting a change of the eddy current, the eddy current flaw detection device including: a detection part for detecting a change of the eddy current; and a magnetic-field forming magnet that is disposed outside the detection part and applies a magnetic field to the test object, wherein a magnetic flux density B (mT) of a magnetic field generated by the magnetic-field forming magnet satisfies Expression 1 on the surface of the test object corresponding to the center of a magnet distal end of the magnetic field forming magnet, the magnet distal end facing the test object, $$400 \times \frac{(xt)^2}{15^4} \leq B \leq 600 \times \frac{(xt)^2}{13^4} \qquad \text{[Expression 1]}$$

where x (mm) is a distance between the center of the detection surface and the center of the magnet distal end, and t (mm) is the thickness of the test object.

The magnetic flux density B (mT) of a magnetic field generated by the magnetic-field forming magnet preferably satisfies Expression 2 on the surface of the test object corresponding to the center of the magnet distal end.

$$400 \times \frac{(xt)^2}{14^4} \leq B \leq 600 \times \frac{(xt)^2}{14^4} \qquad \text{[Expression 2]}$$

The test object of the eddy current flaw detection device according to the present invention may be a metallic canister that contains spent nuclear fuel. In this case, the eddy current flaw detection device preferably generates eddy current on the outer surface the canister and inspects the presence or absence of a flaw on the outer surface of the canister by detecting a change of the eddy current.

The test object of the eddy current flaw detection device according to the present invention is preferably made of austenitic stainless steel.

The test object of the eddy current flaw detection device according to the present invention may include a welded part that is formed by welding austenitic stainless steel. In this case, the eddy current flaw detection device preferably inspects the presence or absence of a flaw on the welded part.

An eddy current flaw detection method according to the present invention in which an eddy current flaw detection device generates eddy current on a test object and inspects the presence or absence of a flaw on the surface of the test object by measuring the eddy current, the method including: generating the eddy current on the test object by the eddy current flaw detection device while applying a magnetic field to the test object by a magnetic-field forming magnet provided for the eddy current flaw detection device; and inspecting the presence or absence of a flaw on the surface of the test object by receiving, by a detection part provided for the eddy current detection device, a magnetic flux generated from the eddy current, wherein a magnetic flux density (mT) of a magnetic field applied to the test object by the magnetic-field forming magnet satisfies Expression 3 on the surface of the test object corresponding to the center of a magnet distal end of the magnetic-field forming magnet, the magnet distal end facing the test object, $$400 \times \frac{(xt)^2}{15^4} \leq B \leq 600 \times \frac{(xt)^2}{13^4} \qquad \text{[Expression 3]}$$

where x (mm) is a distance between the center of the magnet distal end and a center of the detection part, and t (mm) is the thickness of the test object.

Advantageous Effects of Invention

According to the eddy current flaw detection device and the eddy current flaw detection method according to the present invention, noise is sufficiently removed in detection by forming a proper magnetic field even if the magnetic field is not so strong.

DESCRIPTION OF EMBODIMENT

Figure 1:
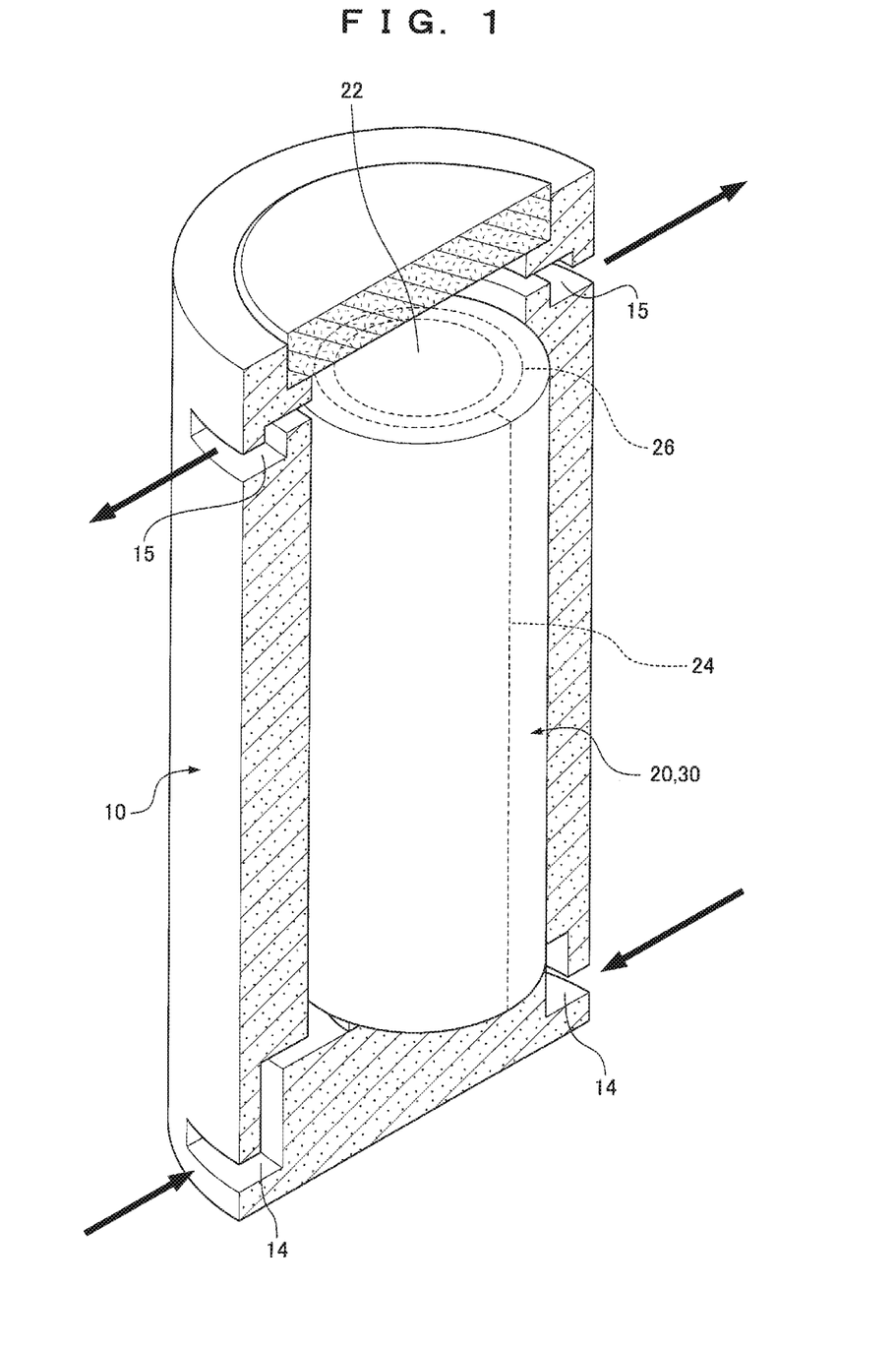
FIG. 1 illustrates a canister to be inspected by an eddy current flaw detection device according to an example of an embodiment of the present invention.

FIG. 1 illustrates a canister 20 (test object) on which a flaw inspection (detection) is conducted by an eddy current flaw detection device according to an example of an embodiment of the present invention. The canister 20 is a metallic cylindrical container that contains spent nuclear fuel. As illustrated in FIG. 1, the canister 20 is stored in a region remote from an urban area, typically in a coastal region while being contained in a large concrete container (concrete cask 10).

In the lower part of the concrete cask 10, an air inlet 14 is provided so as to radially penetrate the concrete cask 10, whereas in the upper part of the concrete cask 10, an air outlet 15 is provided so as to radially penetrate the concrete cask 10. The canister 20 is heated by decay heat from the spent nuclear fuel contained in the canister 20. In the meantime, outside air is drawn from the air inlet 14 and air is discharged from the air outlet 15. In this process, outside air comes into contact with the side of the canister 20, thereby cooling the canister 20.

If the concrete cask 10 is stored in a coastal region, air in the coastal region contains sea salt and thus chloride may rust or corrode the surface of the canister 20 in contact with outside air. Moreover, if a tensile stress is applied to a rusted or corroded point, stress corrosion cracking (SCC) may occur at the point. Thus, the canister 20 is regularly removed from the concrete cask 10 and the presence or absence of SCC is inspected (detected) on the surface of the canister 20.

As illustrated in FIG. 1, the canister 20 includes a cylindrical body with a bottom and a lid 22 closing an opening at the top of the body. The body of the canister 20 and the lid 22 are fixed to each other by welding. As illustrated in FIG. 1, the mark of welding is left as a lid welded part 26. The side of the body of the canister 20 is formed by bending a rectangular metal plate into a cylindrical shape and welding both ends of the metal plate. The mark of welding is also left as a side welded part 24 as illustrated in FIG. 1. The side welded part 24 and the lid welded part 26 are susceptible to a tensile stress and thus SCC is highly likely to occur in the parts. Thus, flaw detection is important particularly on the side welded part 24 and the lid welded part 26.

Figure 2:
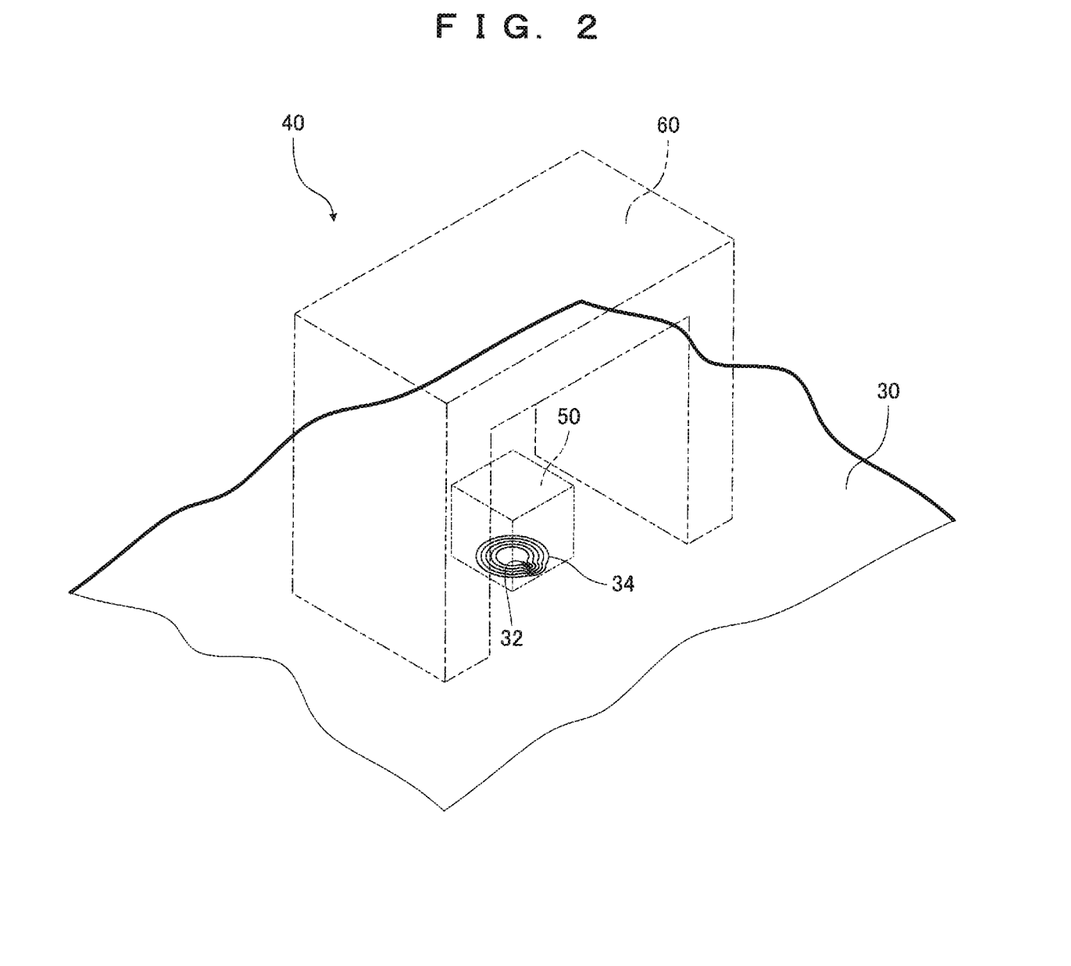
FIG. 2 is a schematic diagram illustrating a state of flaw detection using an eddy current flaw detection device.

FIG. 2 schematically illustrates a state of flaw detection using an eddy current flaw detection device 40. The eddy current flaw detection device 40 includes a inspection probe 50. An alternating magnetic field is generated from the inspection probe 50. When an alternating magnetic field approaches the surface of a test object 30 (e.g., the side wall, lid, and bottom of the canister 20), an eddy current 34 is generated on a metal (typically, austenitic stainless steel in the canister 20) constituting the outer surface of the test object 30. Magnetic flux produced by the eddy current 34 is detected by the inspection probe 50 and a state of the surface of the test object 30 is determined based on the intensity and waveform of a detected magnetic field. For example, if the surface of the test object 30 has a flaw 32 as illustrated in FIG. 2, the area of the flaw 32 has a large electric resistance, so that the eddy current 34 flows while avoiding the flaw 32. This deforms the waveform of the eddy current 34 around the flaw 32 as illustrated in FIG. 2. Hence, the eddy current flaw detection device 40 can inspect the position of the flaw 32 on the surface of the test object 30 by analyzing the waveform of the eddy current 34 and determining the position of deformation of the waveform on the surface of the test object 30.

Figure 3:
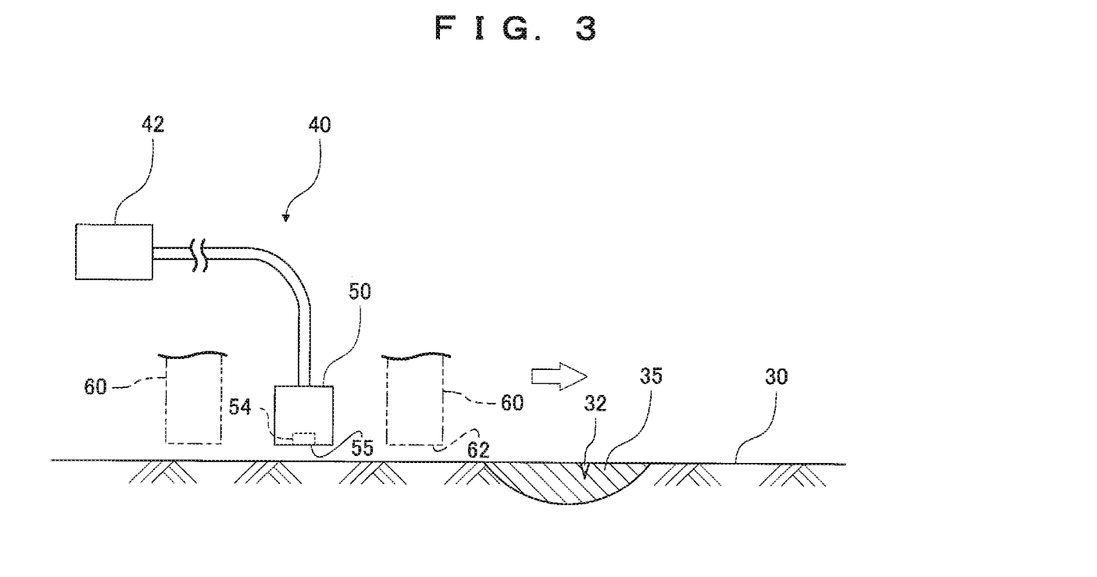
FIG. 3 schematically illustrates an example of the structure of an inspection probe.

FIG. 3 schematically illustrates an example of the structure of the eddy current flaw detection device 40. The eddy current flaw detection device 40 includes the inspection probe 50 and a controller 42. The inspection probe 50 includes a detection part 54 for detecting a change of eddy current generated on the surface of the test object 30. The controller 42 has the function of processing a detection signal received from the inspection probe 50.

In this configuration, the lower end face of the detection part 54 is opposed to the surface of the test object 30. The lower end face serves as a detection surface 55 of the inspection probe 50 that receives magnetic flux from eddy current generated on the test object 30.

In this case, the reaction of the surface of the test object 30 with an alternating magnetic field varies depending upon the property of the material of the test object 30. If the material has a uniform property in an inspection range, the eddy current flaw detection device 40 can conduct flaw detection by searching for a part that reacts with an alternating magnetic field in a different manner from other parts. However, if the property of the material, particularly the magnetic permeability of the material varies among positions, a reaction with an alternating magnetic field varies among positions in the absence of a flaw. Thus, noise is generated so as to affect an inspection, leading to difficulty in flaw detection. Therefore, it is desirable to remove noise as much as possible.

Figure 4:
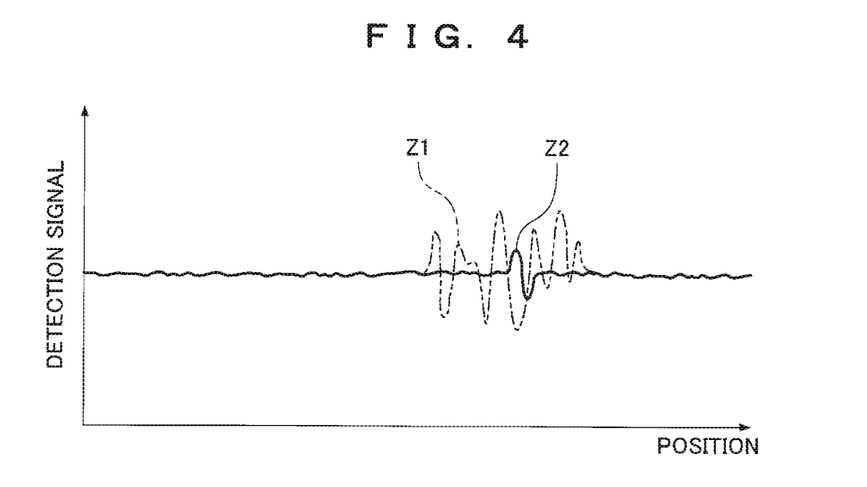
FIG. 4 indicates a detection signal including noise and a detection signal from which noise is removed.

In FIG. 3, a dissimilar material part 35 that is made of a different material having a different magnetic permeability from an adjacent area appears on a part of the surface of the test object 30. For example, if the test object 30 is the canister 20 illustrated in FIG. 1, a dissimilar material may appear on the side welded part 24 and the lid welded part 26 (welded part). Specifically, if the canister 20 is made of austenitic stainless steel, a ferrite alloy may appear on the welded part. In other words, when austenitic stainless steel is melted in the process of welding, the atomic arrangement of iron. (Fe), chromium (Cr), nickel (Ni), molybdenum (Mo), and carbon (C) that constitute the steel is disturbed and thus an alloy having a different atomic arrangement from austenitic stainless steel may appear on the surface of the test object after the completion of welding. In some cases, a ferrite alloy may appear. FIG. 4 indicates a state where noise appears on the detection signal and a state where noise is removed using a magnetic-field forming magnet 60 when the surface of the test object 30 has a heterogeneous magnetic permeability.

The direction of a magnetic field is disturbed at a position where a ferrite alloy is present. Thus, even if the surface has no flaw, the detection signal detected by the inspection probe 50 is changed at a position where a ferrite alloy is present. For this reason, in the welded part on which a ferrite alloy appears, it is difficult to determine whether the detection signal is changed by a flaw or a ferrite alloy. Specifically, as illustrated in FIG. 3, if a ferrite alloy appears on the surface of the test object 30 and forms the dissimilar material part 35, the magnetic flux of an alternating magnetic field generated from the inspection probe 50 is disturbed at the position of the dissimilar material part 35. When the inspection probe 50 passes over the position, noise occurs on the detection signal (a graph Z1 in FIG. 4). Thus, even if the dissimilar material part 35 has the flaw 32, it is difficult to detect a change caused by the flaw 32 on the detection signal.

As indicated by virtual lines in FIGS. 2 and 3, the magnetic-field forming magnet 60 is disposed outside the inspection probe 50, so that the magnetic permeabilities of the test object 30 and the dissimilar material part 35 are changed when a magnetic field is received from the magnetic-field forming magnet 60. By properly setting the intensity of a magnetic field of the magnetic-field forming magnet 60, the test object 30 and the dissimilar material part 35 have substantially equal magnetic permeabilities. Thus, a reaction with an alternating magnetic field from the inspection probe 50 is substantially the same in the dissimilar material part 35 and other parts, so that the detection signal is intensified only at the position of the flaw 32 (a graph Z2 in FIG. 4).

The inventors of the present invention examined conditions such as the thickness of the test object 30 and the position of the magnetic-field forming magnet 60 and determined the intensity of a magnetic field of the magnetic-field forming magnet 60 so as to sufficiently remove noise. Specifically, if a magnetic field generated by the magnetic-field forming magnet 60 in FIG. 3 is measured at a surface position of the test object 30 such that the surface position is opposed to the center of a distal end 62 (magnet distal end) of the magnetic-field forming magnet 60 (a surface of the test object 30 corresponds to the distal end 62) and the distal end 62 faces the test object 30, a millitesla (mT) value of a magnetic flux density B desirably satisfies Expression 4 below.

$$400 \times \frac{(xt)^2}{k^4} \leq B \leq 600 \times \frac{(xt)^2}{k^4} \quad [\text{Expression 4}]$$

Figure 5:
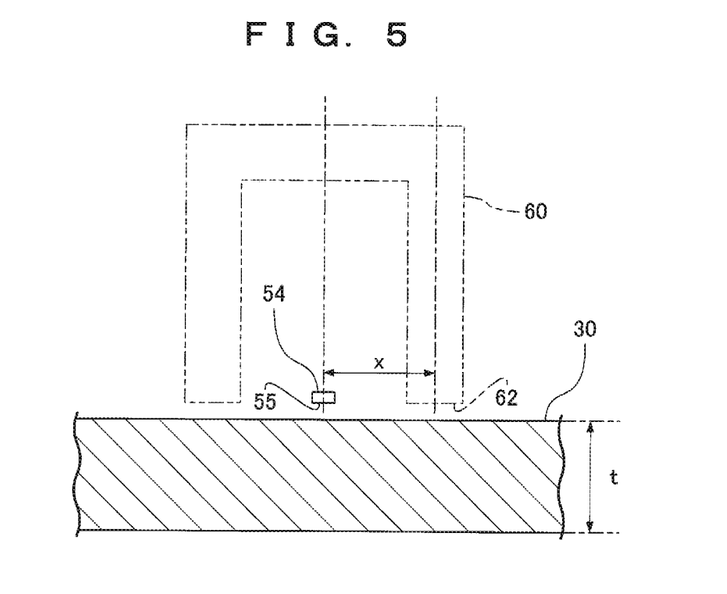
FIG. 5 illustrates the positional relationship among a magnetic-field forming magnet, an inspection surface, and a test object.

As illustrated in FIG. 5, x is a distance (mm) between the center of the distal end 62 (a part serving as a magnetic pole) of the magnetic-field forming magnet 60 and the center of the detection part 54, t is the thickness (mm) of the test object 30 (e.g., the canister 20 of FIG. 1), and k is any numeric value of 13 (inclusive) to 15 (inclusive), preferably k=14. Expression 5 represents the range of the magnetic flux density B of Expression 4 without using k.

$$400 \times \frac{(xt)^2}{15^4} \leq B \leq 600 \times \frac{(xt)^2}{13^4} \quad [\text{Expression 5}]$$

If k=14 is determined in Expression 4, the range of the magnetic flux density B is defined by Expression 6 below.

$$400 \times \frac{(xt)^2}{14^4} \leq B \leq 600 \times \frac{(xt)^2}{14^4} \quad [\text{Expression 6}]$$

In Expression 6, for example, in the case of x=13.75 (mm) and t=14 (mm), B is about 385.84 mT (inclusive) to 578.765 mT (inclusive).

Figure 6:
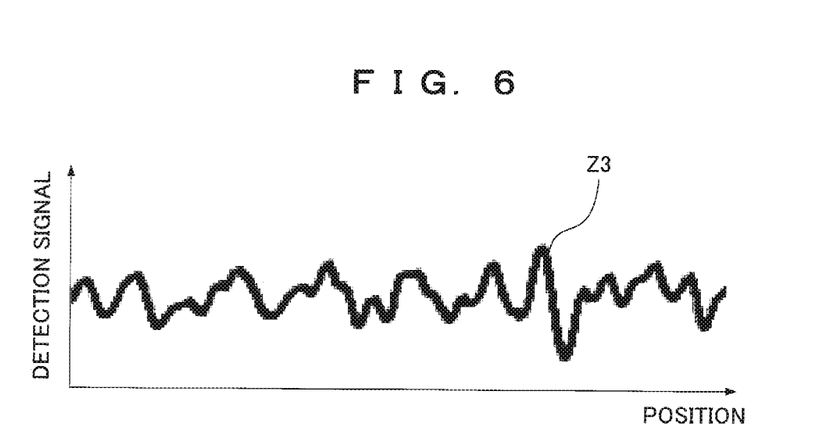
FIG. 6 is a graph of a detection signal including noise.
Figure 7:
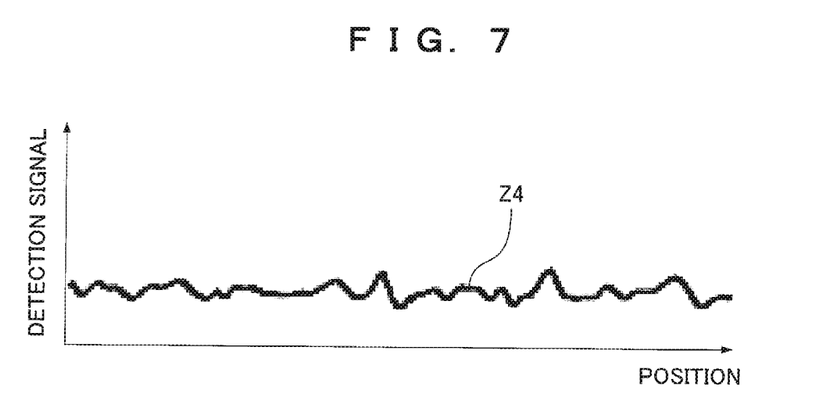
FIG. 7 is a graph of a detection signal including reduced noise.
Figure 8:
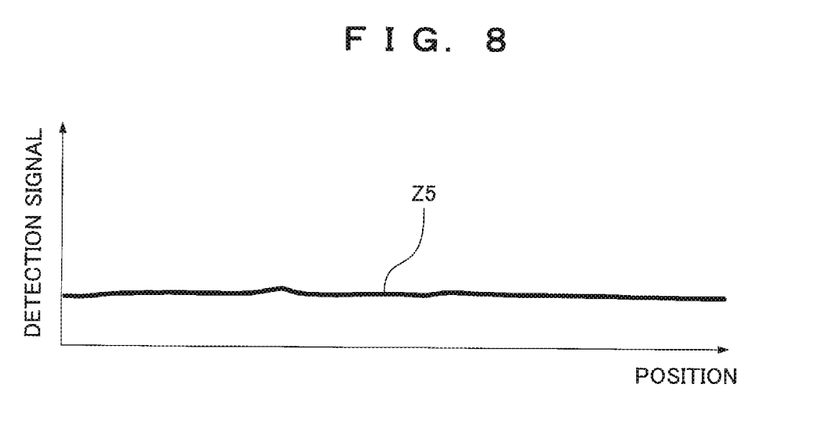
FIG. 8 is a graph of a detection signal from which noise is sufficiently removed.

Referring to FIGS. 6, 7, and 8, noise is sufficiently removed as long as the value of the magnetic flux density B is in the ranges of Expression 4 and Expression 5, which will be described below. Graphs in FIGS. 6, 7, and 8 indicate the detection signal in the detection of the eddy current detection device 40 on the welded part (the side welded part 24 or the lid welded part 26) of canister 20 in FIG. 1. Specifically, the inventors inspected the surface of a welded specimen of austenitic stainless steel, a material of the canister 20, and then examined the obtained detection signal. More specifically, specimens of SUS316 were TIG welded together and then the welded part was inspected. Graphs indicate the detection signal obtained when the surface is unflawed.

FIG. 6 indicates the graph of the detection signal obtained when the welded part is inspected only by the inspection probe 50 without using the magnetic-field forming magnet 60 illustrated in FIG. 3. As indicated by a graph Z3 in FIG. 6, even if the surface of the specimen is not flawed, many fluctuations appear and noise occurs in the detection signal due to the influence of a dissimilar metal (e.g., a ferrite alloy) appearing on the welded part. FIGS. 7 and 8 show the graphs of the detection signal obtained by using the magnetic-field forming magnet 60. In FIGS. 7 and 8, the conditions of x and t are identical to those of Expression 6 and x 13.75 (mm) and t=14 (mm) are determined. A graph Z4 in FIG. 7 shows the detection signal obtained when the value of the magnetic flux density B is 300 mT. 300 mT is a value in the range (293 mT or more) obtained by Expression 5 when x=13.75 (mm) and t=14 (mm) are determined. The graph Z4 in FIG. 7 has smaller fluctuations than the graph Z3 in FIG. 6. Noise reduced to this level can be made negligible by processing signals, such as filtering, by an observer. Specifically, the magnetic flux density B of 300 (mT) can reduce noise to a permissible range.

A graph Z5 in FIG. 8 shows the detection signal obtained when the value of the magnetic flux density B is 500 mT. 500 mT is in the range of the magnetic flux density B in Expression 6. The graph Z5 in FIG. 8 is further flattened from the graph Z4 in FIG. 7. Noise is sufficiently removed by the magnetic flux density B of 500 (mT).

In this way, noise can be removed to the permissible range by a low magnetic flux density of 300 to 500 mT in the present embodiment. In the eddy current flaw detection method of the related art using the magnetic saturation method, sufficient noise removal in an inspection of austenitic stainless steel rewires a high magnetic flux density of 1 T to several tens T. This proves that the present invention can remove noise with a considerably lower magnetic flux density than the method of the related art. Thus, unlike in the method of the related art, it is not necessary to use expensive materials and devices for obtaining a high magnetic flux density. Furthermore, the eddy current flaw detection device 40 is not attracted by a strong magnetic force and thus is not difficult to move on the surface of the test object 30.

In the eddy current flaw detection method of the related art using the magnetic saturation method, a high magnetic flux density is necessary. This is because magnetic saturation of austenitic stainless steel requires a magnetic flux density of 1 T to several tens T. However, in order to remove noise caused by a difference in magnetic permeability among materials contained in the test object, it is not always necessary to completely perform magnetic saturation on the test object. Noise caused by a difference in magnetic permeability is removed as long as the materials have substantially equal magnetic permeabilities in an applied magnetic field. The magnetic permeability of a ferrite alloy appearing in the welded part of austenitic stainless steel and the magnetic permeability of austenitic stainless steel are substantially equal to each other in magnetic flux densities satisfying Expression 5. Even if the magnetic permeabilities are not equal to each other, noise caused by a difference in magnetic permeability is reduced as long as the magnetic permeabilities are close to each other. It can be assumed that noise is reduced to fall within the permissible range if noise is reduced to a level where the depth of a flaw can be estimated. According to the present embodiment, a magnetic field having a relatively low magnetic flux density is applied to the test object 30, bringing the magnetic permeability of the dissimilar material part 35 in FIG. 3 close to the magnetic permeability of the original material of the test object 30. Thus, noise caused by a difference in magnetic permeability is reduced to fall within the permissible range.

In the present embodiment, particularly the canister 20 in FIG. 1 serves as the test object 30 made of austenitic stainless steel. The eddy current flaw detection device 40 can be used for flaw detection of all materials on which eddy current may occur.

The specific configuration of the detection part 54 of the eddy current detection device 40 may be changed in various ways as long as a change of eddy current generated on the surface of the test object 30 can be detected. For example, uniform eddy current may be generated by a large exciting coil and a change of eddy current may be detected by a small detecting coil that is disposed below the exciting coil and has the central axis orthogonal to the exciting coil. Alternatively, two detecting coils may be disposed with an exciting coil interposed therebetween and a current difference between the two detecting coils may be measured as a detection signal. Additionally, a change of impedance may be measured to allow a single coil to act as both of an exciting coil and a detecting coil. In all of the configurations, the exciting coil and the detecting coil are generally disposed with plane symmetry or axial symmetry and thus it is assumed that the center of symmetry is located at the center of the detection part 54.

REFERENCE SIGNS LIST 10 concrete cask
20 canister
30 test object
40 eddy current flaw detection device
50 inspection probe
54 detection part
55 detection surface
60 magnetic-field forming magnet
62 distal end

The invention claimed is:

1. An eddy current flaw detection method in which an eddy current flaw detection device generates eddy current on a test object and inspects presence or absence of a flaw on a surface of the test object by measuring the eddy current, the method comprising:
generating the eddy current on the test object by the eddy current flaw detection device while applying a magnetic field to the test object by a magnetic-field forming magnet provided for the eddy current flaw detection device; and inspecting the presence or absence of a flaw on the surface of the test object by receiving, by a detection part provided for the eddy current detection device, a magnetic flux generated from the eddy current,
wherein a magnetic flux density B (mT) of a magnetic field applied to the test object by the magnetic-field forming magnet satisfies Expression 3 on the surface of the test object corresponding to a center of a magnet distal end of the magnetic-field forming magnet, the magnet distal end facing the test object, $$400 \times \frac{(xt)^2}{15^4} \leq B \leq 600 \times \frac{(xt)^2}{13^4} \qquad \text{[Expression 3]}$$

where x (mm) is a distance between the center of the magnet distal end and a center of the detection part, and t (mm) is a thickness of the test object.

2. The eddy current flaw detection method according to claim 1, wherein the magnetic flux density B (mT) of a magnetic field generated by the magnetic-field forming magnet satisfies Expression 4 on the surface of the test object corresponding to the center of the magnet distal end $$400 \times \frac{(xt)^2}{14^4} \leq B \leq 600 \times \frac{(xt)^2}{14^4}. \quad \text{[Expression 4]}$$

3. The eddy current flaw detection method according to claim 1, wherein the test object is a metallic canister that contains spent nuclear fuel, and wherein the eddy current flaw detection device generates eddy current on an outer surface of the canister and inspects presence or absence of a flaw on the outer surface of the canister by detecting a change of the eddy current.

4. The eddy current flaw detection method according to claim 1, wherein the test object is made of austenitic stainless steel.

5. The eddy current flaw detection method according to claim 4, wherein the test object includes a welded part that is formed by welding austenitic stainless steel, and the eddy current flaw detection method inspects presence or absence of a flaw on the welded part.

\* \* \* \* \*